US010162105B2

(12) United States Patent
Jurik et al.

(10) Patent No.: US 10,162,105 B2
(45) Date of Patent: Dec. 25, 2018

(54) WASH LIGHT LUMINAIRE WITH SPECIAL EFFECTS CAPABILITIES

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 15/075,191

(22) Filed: Mar. 20, 2016

(65) Prior Publication Data
US 2017/0269292 A1    Sep. 21, 2017

(51) Int. Cl.
*F21V 7/04*    (2006.01)
*F21V 8/00*    (2006.01)
(Continued)

(52) U.S. Cl.
CPC .............. *G02B 6/0096* (2013.01); *F21V 3/00* (2013.01); *F21V 5/02* (2013.01); *F21V 5/04* (2013.01); *F21V 5/048* (2013.01); *F21V 14/04* (2013.01); *F21V 14/06* (2013.01); *F21V 21/28* (2013.01); *G02B 5/02* (2013.01); *G02B 6/00* (2013.01); *G02B 6/0001* (2013.01); *G02B 27/30* (2013.01); *F21V 2200/00* (2015.01); *F21V 2200/40* (2015.01); *F21W 2121/00* (2013.01); *F21W 2131/406* (2013.01); *F21Y 2105/10* (2016.08); *F21Y 2113/13* (2016.08); *F21Y 2113/17* (2016.08); *F21Y 2115/10* (2016.08)

(58) Field of Classification Search
CPC . F21V 29/10; F21V 9/04; F21V 14/08; F21V 13/14; F21S 10/00; F21S 10/007; F21W 2131/406; F21Y 2113/13; F21Y 2113/10; G02B 27/30; G02B 6/0096; G02B 6/10
See application file for complete search history.

(56) References Cited

U.S. PATENT DOCUMENTS 8,525,999 B2 * 9/2013 Brukilacchio ....... A61B 1/0653
356/432
9,261,269 B2    2/2016 Jurik et al.
(Continued)

FOREIGN PATENT DOCUMENTS

EP    2177816 A2    4/2010
WO    2010113100 A1    10/2010
(Continued)

OTHER PUBLICATIONS

Office Action dated Oct. 26, 2017; U.S. Appl. No. 15/089,116 dated Apr. 1, 2016; 7 pages.
(Continued)

*Primary Examiner* — Ali Alavi
(74) *Attorney, Agent, or Firm* — Conley Rose, P.C.; Grant Rodolph; Brooks W Taylor (57) ABSTRACT

An automated luminaire includes a light engine having a multi-color LED array light source, a light guide which incompletely homogenizes such that colored light beams visibly retain separation and individual color, and a zoom lens system that projects the incompletely homogenized light beams in a spreading pattern that opens and closes as lenses are moved toward and away from the light guide.

16 Claims, 11 Drawing Sheets

(51) Int. Cl.
  *F21V 3/00* (2015.01)
  *F21V 5/02* (2006.01)
  *F21V 5/04* (2006.01)
  *F21V 14/06* (2006.01)
  *F21V 21/28* (2006.01)
  *G02B 5/02* (2006.01)
  *G02B 27/30* (2006.01)
  *F21V 14/04* (2006.01)
  *G02B 6/00* (2006.01)
  *F21Y 113/17* (2016.01)
  *F21Y 115/10* (2016.01)
  *F21W 121/00* (2006.01)
  *F21W 131/406* (2006.01)
  *F21Y 105/10* (2016.01)
  *F21Y 113/13* (2016.01)

(56) References Cited

U.S. PATENT DOCUMENTS

| | | |
|---|---|---|
| 2001/0007527 A1 | 7/2001 | Lammers et al. |
| 2007/0024971 A1 | 2/2007 | Cassarly et al. |
| 2010/0188018 A1* | 7/2010 | Salm ............ F21V 7/00 315/294 |
| 2011/0170289 A1* | 7/2011 | Allen ............ F21V 13/12 362/235 |
| 2012/0243215 A1 | 9/2012 | Jurik |
| 2015/0092418 A1 | 4/2015 | Jurik et al. |
| 2015/0103553 A1* | 4/2015 | Jurik ............ G02B 6/0096 362/551 |
| 2016/0018064 A1 | 1/2016 | Jurik et al. |
| 2016/0040854 A1 | 2/2016 | Zhang |
| 2016/0054646 A1 | 2/2016 | Chang et al. |
| 2017/0090115 A1 | 3/2017 | Jurik et al. |

FOREIGN PATENT DOCUMENTS

| | | | |
|---|---|---|---|
| WO | WO 2013184600 A1 * | 12/2013 | ......... F21S 8/00 |
| WO | WO 2014031641 A2 * | 2/2014 | ...... G02B 19/0066 |
| WO | 2015051034 A2 | 4/2015 | |
| WO | 2015138483 A2 | 9/2015 | |
| WO | WO 2015138476 A2 * | 9/2015 | ...... G02B 19/0052 |

OTHER PUBLICATIONS

PCT International Search Report; Application No. PCT/US2017/023205; Aug. 1, 2017; 3 pages.
PCT Written Opinion of the International Searching Authority; Application No. PCT/US2017/023205; Aug. 1, 2017; 6 pages.
PCT International Search Report; Application No. PCT/US2017/025658; Aug. 23, 2017; 3 pages.
PCT Written Opinion of the International Searching Authority; Application No. PCT/US2017/025658; Aug. 23, 2017; 5 pages.
Notice of Allowance dated May 18, 2018; U.S. Appl. No. 15/089,116 dated Apr. 1, 2016; 12 pages.
Jurik, Pavel, et al.; U.S. Appl. No. 16/144,810, filed Sep. 27, 2018; Title: Wash Light Luminaire with Special Effects Capabilities; 35 pages.

* cited by examiner

WASH LIGHT LUMINAIRE WITH SPECIAL EFFECTS CAPABILITIES

TECHNICAL FIELD OF THE DISCLOSURE

The present disclosure generally relates to a method for providing special effects in luminaires, specifically to a method relating to providing single and multiple beams from a single luminaire.

BACKGROUND OF THE DISCLOSURE

Luminaires with automated and remotely controllable functionality are well known in the entertainment and architectural lighting markets. Such products are commonly used in theatres, television studios, concerts, theme parks, night clubs and other venues. A typical product will provide control over the functions of the luminaire allowing the operator to control the intensity and color of the light beam from the luminaire that is shining on the stage or in the studio. Many products also provide control over other parameters such as the position, focus, beam size, beam shape and beam pattern. In such products that contain light emitting diodes (LEDs) to produce the light output it is common to use more than one color of LEDs and to be able to adjust the intensity of each color separately such that the output, which comprises the combined mixed output of all LEDs, can be adjusted in color. For example, such a product may use red, green, blue, and white LEDs with separate intensity controls for each of the four types of LEDs. This allows the user to mix almost limitless combinations and to produce nearly any color they desire.

Figure 1:
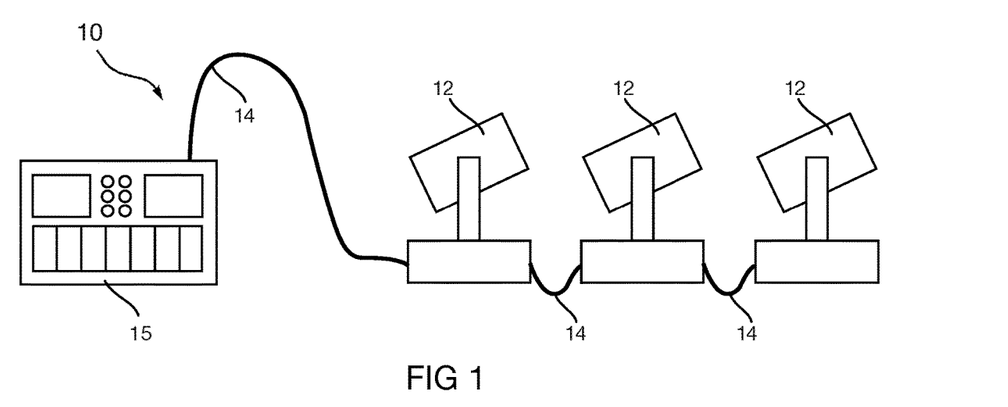
FIG. 1 illustrates a multiparameter automated luminaire lighting system.

FIG. 1 illustrates a typical multiparameter automated luminaire system 10. These systems typically include a plurality of multiparameter automated luminaires 12 which typically each contain on-board a light source (not shown), light modulation devices, electric motors coupled to mechanical drive systems, and control electronics (not shown). In addition to being connected to mains power either directly or through a power distribution system (not shown), each automated luminaire 12 is connected is series or in parallel to data link 14 and to one or more control desks 15. The luminaire system 10 is typically controlled by an operator through the control desk 15.

Luminaires have been provided using non-LED light sources designed to produce a single narrow beam or a plurality of such beams. Such luminaires may use low etendue, High Intensity Discharge (HID) light sources with a small arc gap in order to facilitate the production of tight, almost parallel light beams. U.S. patent application Ser. Nos. 14/042,758 and 14/042,759 provide examples of such a system. Single and multi-color LED sourced luminaires have also been produced with narrow beam capability using sophisticated collimation systems as, for example, disclosed in U.S. patent application Ser. No. 14/405,355. LEDs however are high etendue light sources by comparison with HID and it is difficult to produce multiple beam systems using LED light sources.

There is a need for a method for producing and controlling a light beam or multiple light beams from an LED sourced luminaire to produce controllable lighting effects.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the FIGURES, like numerals being used to refer to like and corresponding parts of the various drawings.

The present disclosure generally relates to a method for providing special effects in luminaires, specifically to a method relating to providing single and multiple beams from a single luminaire.

Figure 2:
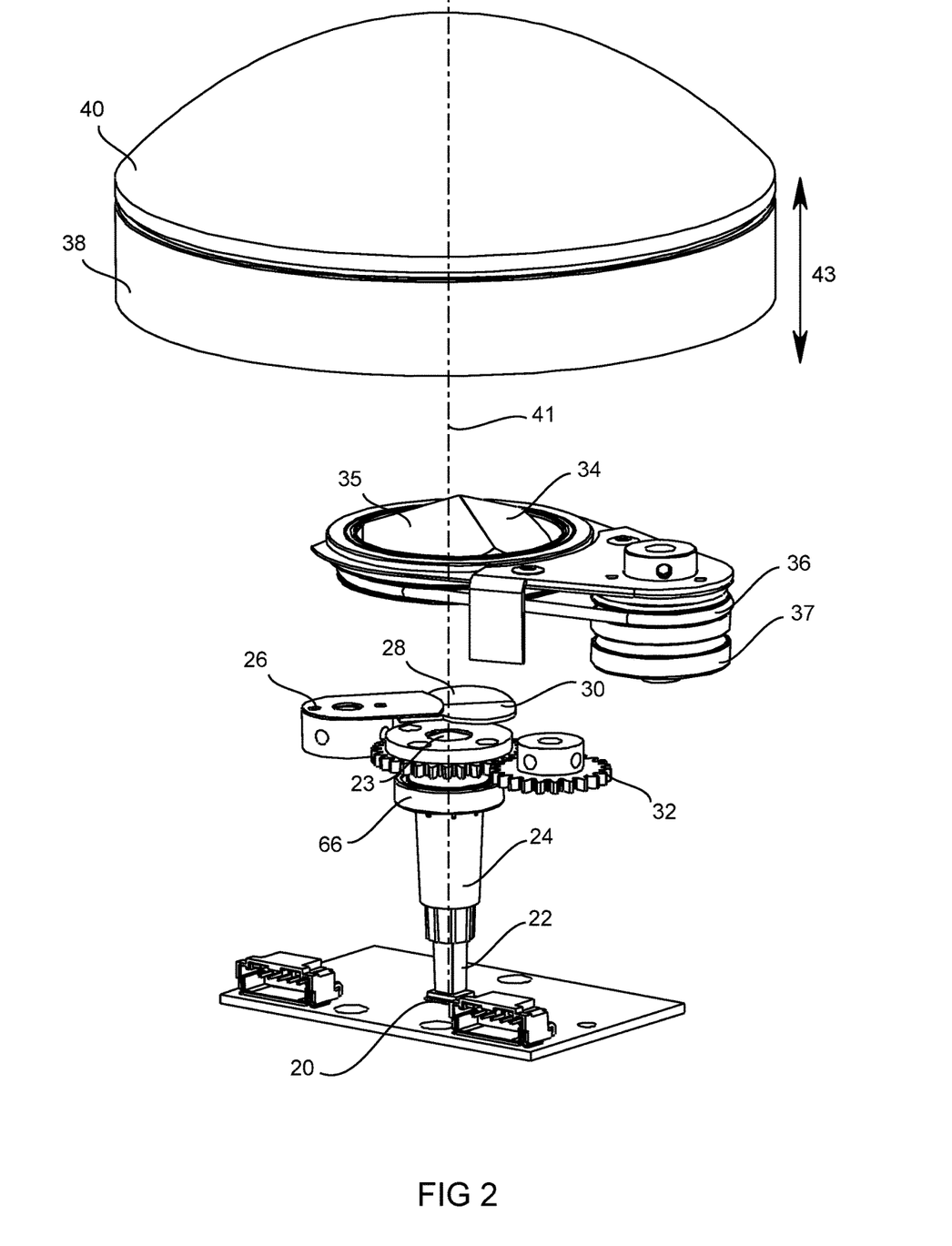
FIG. 2 illustrates the layout of embodiments of major components of a light engine of a luminaire generating a flower effect.

FIG. 2 illustrates the layout of embodiments of major components of a light engine of a luminaire generating a flower effect. Light emitting module 20 comprises a single LED or an array of LEDs, which may include a primary optic (not shown). Light emitting module 20 may contain a single color of LEDs or may contain multiple dies, each of which may be of common or differing colors. For example, in one embodiment light emitting module 20 may comprise one each of a Red, Green, Blue and White LED. In further embodiments light emitting module 20 may comprise a single LED chip or package while in yet further embodiments light emitting module 20 may comprise multiple LED chips or packages either under a single primary optic or each package with its own primary optic. In some embodiments these LED die(s) may be paired with optical lens element(s) as part of the LED light-emitting module. In a further embodiment light emitting module 20 may comprise more than four colors of LEDs. For example, seven colors may be used, one each of a Red, Green, Blue, White, Amber, Cyan, and Deep Blue/UV LED die.

The light output from the LEDs in light emitting module 20 enters light guide optic 22 contained within protective sleeve 24. Light guide optic 22 may be a device utilizing internal reflection so as to collect, homogenize and constrain, and conduct the light to exit port 23. Light guide optic 22 may be a hollow tube with a reflective inner surface such that light impinging into the entry port may be reflected multiple times along the tube before leaving at the exit port 23. Light guide optic 22 may be a square tube, a hexagonal tube, a heptagonal tube, an octagonal tube, a circular tube, or a tube of any other cross section. In a further embodiment, light guide optic 22 may be a solid rod constructed of glass, transparent plastic, or other optically transparent material where the reflection of the incident light beam within the rod is due to "total internal reflection" (TIR) from the interface between the material of the rod and the surrounding air. The integrating rod may a square rod, a hexagonal rod, a heptagonal rod, an octagonal rod, a circular rod, or a rod of any other cross section. Light guide optic 22, whether solid or hollow, and with any number of sides, may have entry port 21 and exit port 23 that differ in cross sectional shape. For example, a square entry port 21 and an octagonal exit port 23. Further light guide optic 22 may have sides which are tapered so that the entrance aperture is smaller than the exit aperture. The advantage of such a structure is that the divergence angle of light exiting the guide optic 22 at exit port 23 will be smaller than the divergence angle for light entering the light guide optic 22. The combination of a smaller divergence angle from a larger aperture serves to conserve the etendue of the system. Thus, a tapered light guide optic 22 may provide similar functionality to a condensing optical system. In a preferred embodiment of the present disclosure light guide optic 22 has both a square entry port 21 and a square exit port 23. For the desired flower reminiscent effect it is advantageous to use shapes with opposing sides and to have the same shape cross section along the length of the guide optic 22.

Light guide optic 22 may have an aspect ratio where its length is much greater than its diameter. The greater the ratio between length and diameter, the better the resultant mixing and homogenization will be. Light guide optic 22 may be enclosed in a tube or protective sleeve 24 that provides mechanical protection against damage, scratches, and dust. In the preferred embodiment, light guide optic 22 is of such a length so as to collimate and direct but deliberately provide incomplete homogenization of the light coming from individual LEDs on light emitting module 20. This incomplete homogenization may be advantageously utilized in the remainder of the optical system. Similarly, the exit port 23 of light guide optic 22 is polished, rather than being diffused or textured, to maintain the incomplete homogenization of the input light beams. In one embodiment, the beams are less than 50% homogenized such that individual beams or colors from separate LEDs are still clearly visible.

Light guide optic 22, within its protective sleeve 24, is mounted such that it may be freely rotated along its long, optical, axis through gear 32 and motor (not shown) supported by bearing 66. Rotating light guide optic 22 will cause the emitted light beams from exit port 23 to also rotate around the optical axis of the system. In fact, the light beam movement and rotation will be complex, as a function of the rotation of the input port of light guide optic 22 across the array of LEDs in fixed light emitting module 20 and the total internal reflection within the rotating light guide. Thus, the light beams exiting the light guide optic 22 will present a complex and dynamic pattern of moving beams. Light guide optic 22 may be rotated in either direction and at any speed under control of the operator.

With the disclosure in its basic form, the light from the exit port 23 of light guide optic 22 will be directed towards and through first lens 38 and second lens 40 that serve to further control the angle of the emitted light beam. First lens 38 and second lens 40 may be moved as a pair towards and away from light guide optic 22 in the direction along the optical axis of the system shown by line 41. In the position where first lens 38 and second lens 40 are at their furthest separation from the exit port 23 of light guide optic 22, the emitted light beam will have a narrow beam angle. In the position where first lens 38 and second lens 40 are at their closest separation from the exit port 23 of light guide optic 22, the emitted light beam will have a wide beam angle. Intermediate positions of the lenses 38 and 40 with respect to exit port 23 of light guide optic 22 will provide intermediate beam angles. First lens 38 and second lens 40 may advantageously be configured as an achromatic pair so as to minimize chromatic aberration of the emitted light beam or beams. The system illustrated herein utilizes two lens elements to provide output beam control, first lens 38 and second lens 40. The disclosure is, however, not so limited, and further embodiments may contain different numbers and types of lenses or other optical systems as well known in the art. In particular, further embodiments may utilize systems where the relationship of first lens 38 and second lens 40 is not fixed, and can alter. Lenses 38 and 40 may be meniscus lenses, plano convex lenses, bi-convex lenses, holographic lenses, aspheric lenses, or other lenses as well known in the art. Lenses 38 and 40 may be constructed of glass, transparent plastic or other optically transparent material as known in the art.

With the layout as described the effect from the luminaire will be that of a complex pattern of a plurality of light beams created by the reflection of the individual beams from the LEDs in light emitting module 20 within light guide optic 22. As no diffusion or other homogenization is provided, these beams will remain in differing colors and patterns through projection lens system comprising first lens 38 and second lens 40. As the light guide optic 22 is rotated, and first lens 38 and second lens 40 are moved towards and away from the exit port 23 of light guide optic 22, the effect will be that of a flower or spreading pattern of beams that opens and closes as the lenses are moved.

The beams in the optical flower effect thus created may be further enhanced by inserting prism 34 across the beam in between exit port 23 of light guide optic 22 and first lens 38. Prism 34 may be rotated around the optical axis when in position across the light beam. Motors may connect to drive systems 36 and 37 to enable control of insertion/removal of prism 34 across the light beam and rotating prism 34. In the embodiment illustrated, prism 34 is shown with 3 facets 35, for example, spaced symmetrically around the circumference of the prism 34, producing a tripling of the beam numbers. In practice the prism may be of any shape or design with any number, orientation, and shape of facets. Prism 34 may be constructed of glass, transparent plastic, or other optically transparent material as known in the art. Prism 34 may further be formed as a holographic diffusion or diffraction pattern.

As a further refinement to the optical system, diffuser arm 26 may be swung across the light beam proximate to exit port 23 of light guide optic 22. Diffuser arm 26 may contain a number of diffusers each of which may have different diffusion properties. In the embodiment illustrated, diffuser arm 26 is fitted with first diffuser 28 and second diffuser 30, however further embodiments may have differing numbers of diffusers. In operation diffuser arm 26 is rotated such that one of the diffusers 28 or 30 is positioned proximate to exit port 23 of light guide optic 22 and will serve to diffuse and homogenize the light beams emitting from exit port 23 before they pass into the remainder of the optical system. The diffuser serves to merge the light beams into a single beam and to increase the spread of the light beam. Differing strengths or properties of diffuser 28 or 30 may provide narrow or wide homogenized beams without the flower effect or for lower powered diffusers a softening of the flower effect. In this mode of operation, first lens 38 and second lens 40 will continue to control the overall size of the homogenized beam. Similarly, prism 34 will continue to multiply and affect the homogenized beam.

Figure 3:
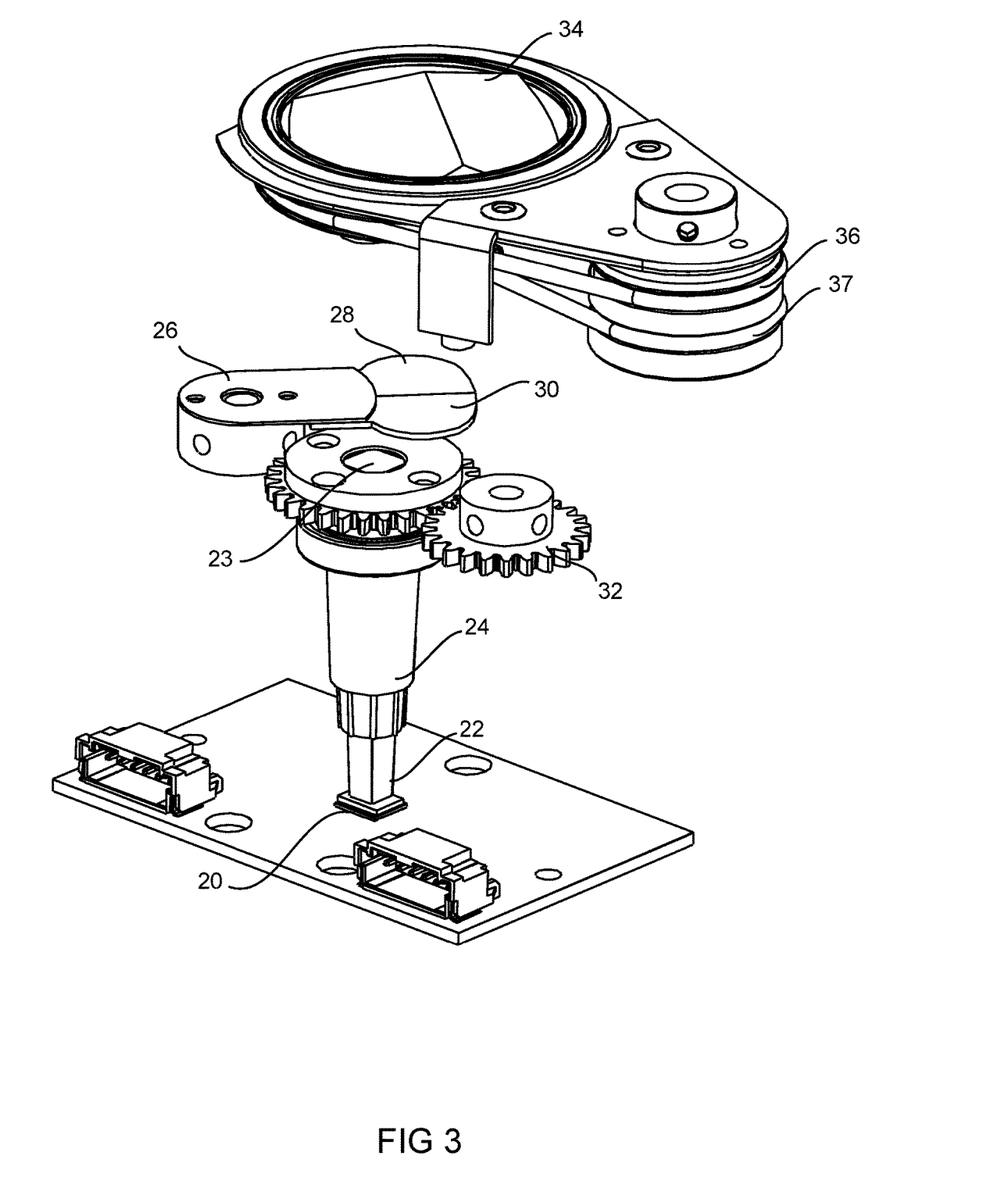
FIG. 3 illustrates more detail of some of embodiments of the major components and layout of the light engine illustrated in FIG. 2.

FIG. 3 illustrates more detail of some of embodiments of the major components and layout of the light engine illustrated in FIG. 2. More specifically, in FIG. 3, exit port 23 of light guide optic 22 and the means for moving diffusers 28 and 30 across that exit port 23 can may more clearly be seen.

Figure 4:
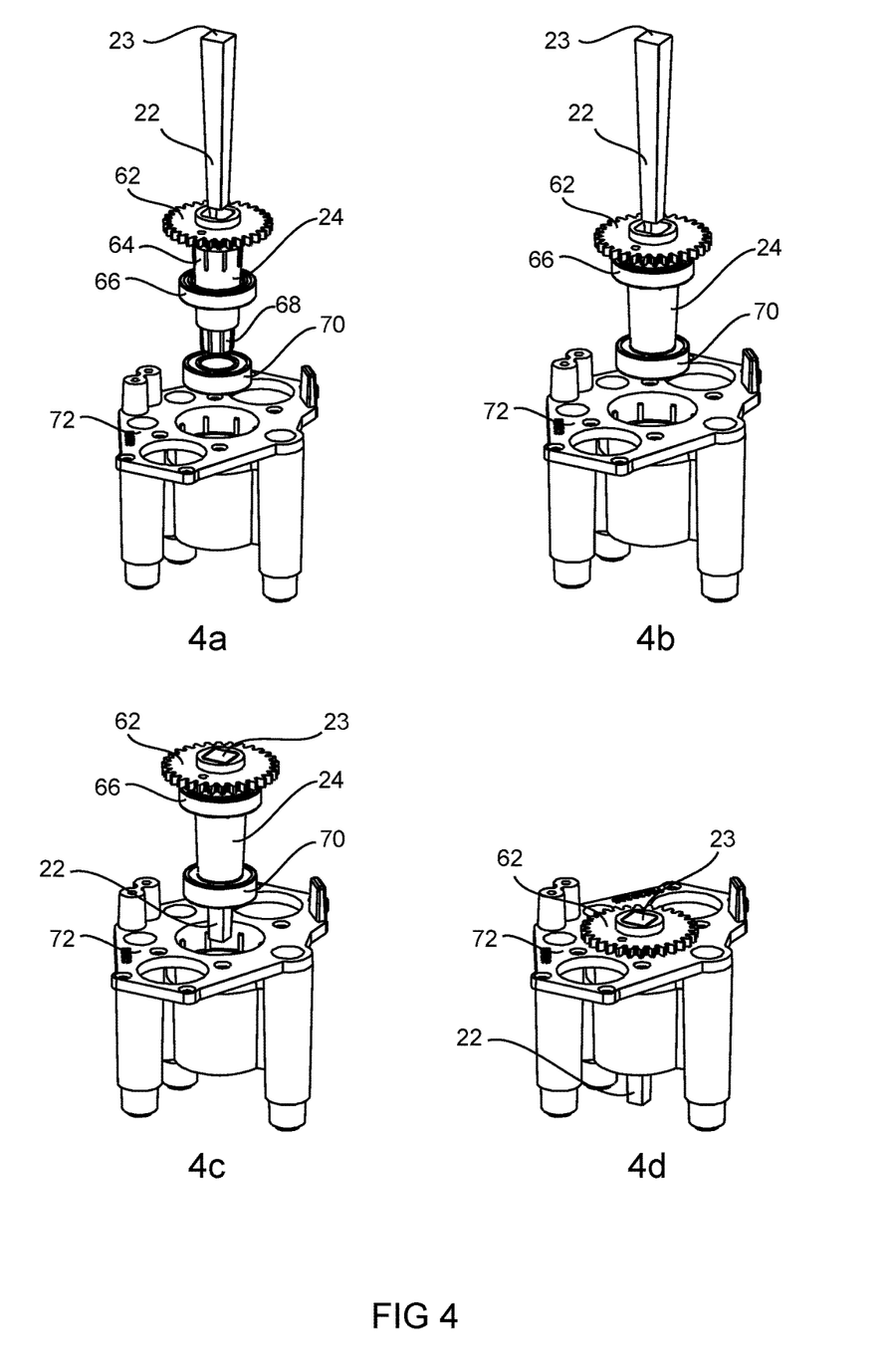
FIG. 4 illustrates and embodiment of additional support structure for the light guide assembly.

FIG. 4 illustrates the light guide assembly including its support structure. Sub FIGS. 4*a*, 4*b*, 4*c*, and 4*d* show the assembly from fully exploded (4*a*) through fully assembled (4*d*) to aid comprehension of the structure. Light guide optic 22 with exit port 23 is inserted into protective sleeve 24. Protective sleeve 24 has, as parts of its structure, bearing support surfaces 64 and 68. Bearing support surfaces 64 and 68 engage with bearings 66 and 70 respectively. This allows protective sleeve 24 (and thus light guide optic 22) to rotate within bearings 66 and 70. Also attached to protective sleeve 24 is gear 62 which meshes with gear 32 shown in FIG. 6 that is in turn driven by motor 33. The assembly formed by protective sleeve 24, light guide optic 22, bearings 66 and 70, and gear 62, is supported within holder 72 such that (as shown in FIG. 4*d*) light guide optic 22 protrudes from the base of holder 72 and aligns with light emitting module 20. This assembly also serves to maintain a small separation between entry port 21 of light guide optic 22 and light emitting module 20 such that light transfer from light emitting module 20 and light guide optic 22 is maximized but the two surfaces do not touch.

In further embodiments it is envisaged that light guide assemblies as shown in FIG. 4 could be used in multiples or arrays within a single luminaire. For example, a square array of rotating light guide assemblies may be used where each light guide is positioned above its own light emitting module. In these embodiments a single motor may drive the rotation of multiple light drive assemblies.

Figure 5:
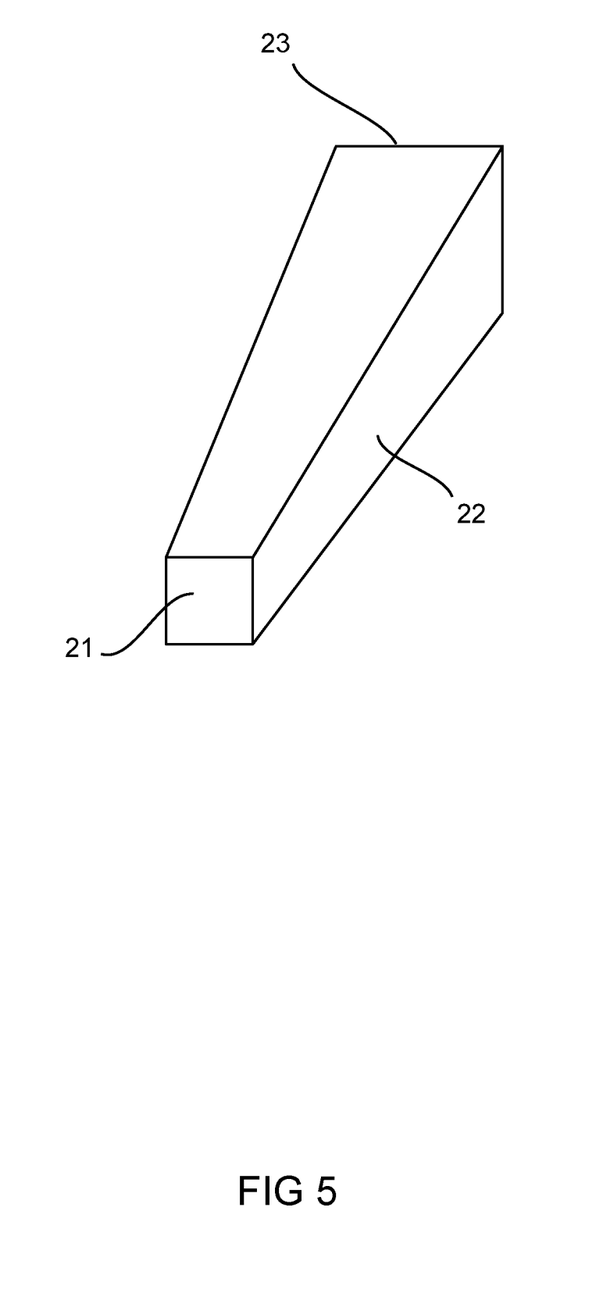
FIG. 5 illustrates an embodiment of a light guide optic without any supporting structure.

FIG. 5 illustrates an embodiment of a light guide optic 22 without its support structure. Light guide optic 22 contains entry port 21 and exit port 23. In the embodiment illustrated, light guide optic 22 is tapered and has both a square entry port 21 and a square exit port 23.

Figure 6:
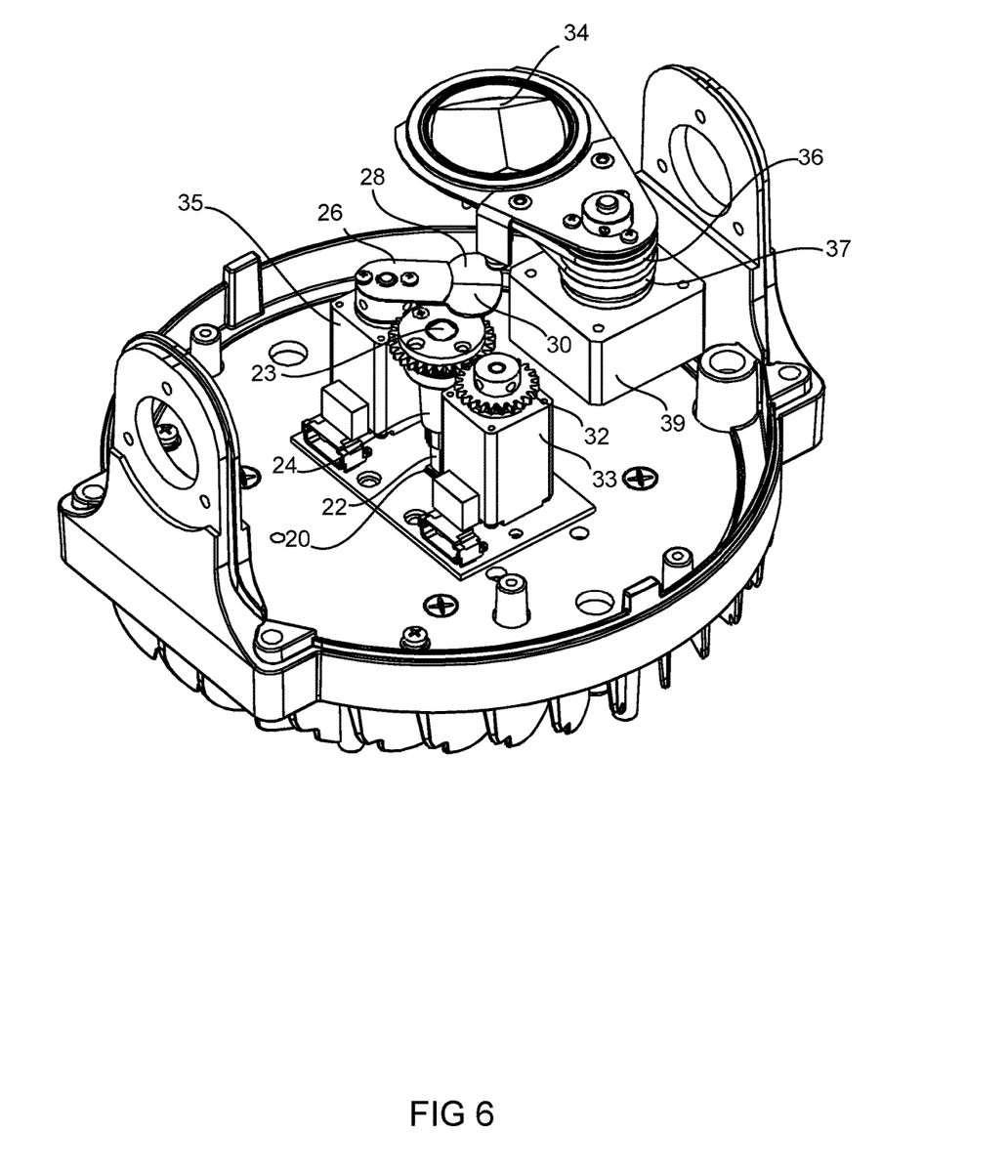
FIG. 6 illustrates the layout of a luminaire utilizing an embodiment of the optical softening elements disengaged.

FIG. 6 illustrates the layout of a luminaire utilizing an embodiment of the optical softening elements disengaged. This figure shows the same system as FIG. 2 with further detail on the movement systems in an embodiment. Motor 33 provides the motion for rotating light guide optic 22 through gear 32, and motor 35 provides the motion for diffuser arm 26. Similarly, motor 39 is one of two motors (second not shown) that insert/remove and rotate prism 34 across the beam. Similar motors and drive systems as well known in the art provide the motion for first lens 38 and second lens 40 along the optical axis of the luminaire. Motors 33, 35, and 39 may be stepper motors, servo motors, linear actuators, solenoids, Direct Current (DC) motors, or other mechanisms as well known in the art. In the embodiment shown, the motors operate through gear 32 or drive systems 36 and 37. For example, motor 33 drives gear 32. Other mechanisms for actuating the desired movement as are well known in the art are also contemplated. In the position illustrated in FIG. 6, prism 34 is out of the light beam as are both first diffuser 28 and second diffuser 30. In this position the undiffused light beam presents the flower effect previously described.

Figure 7:
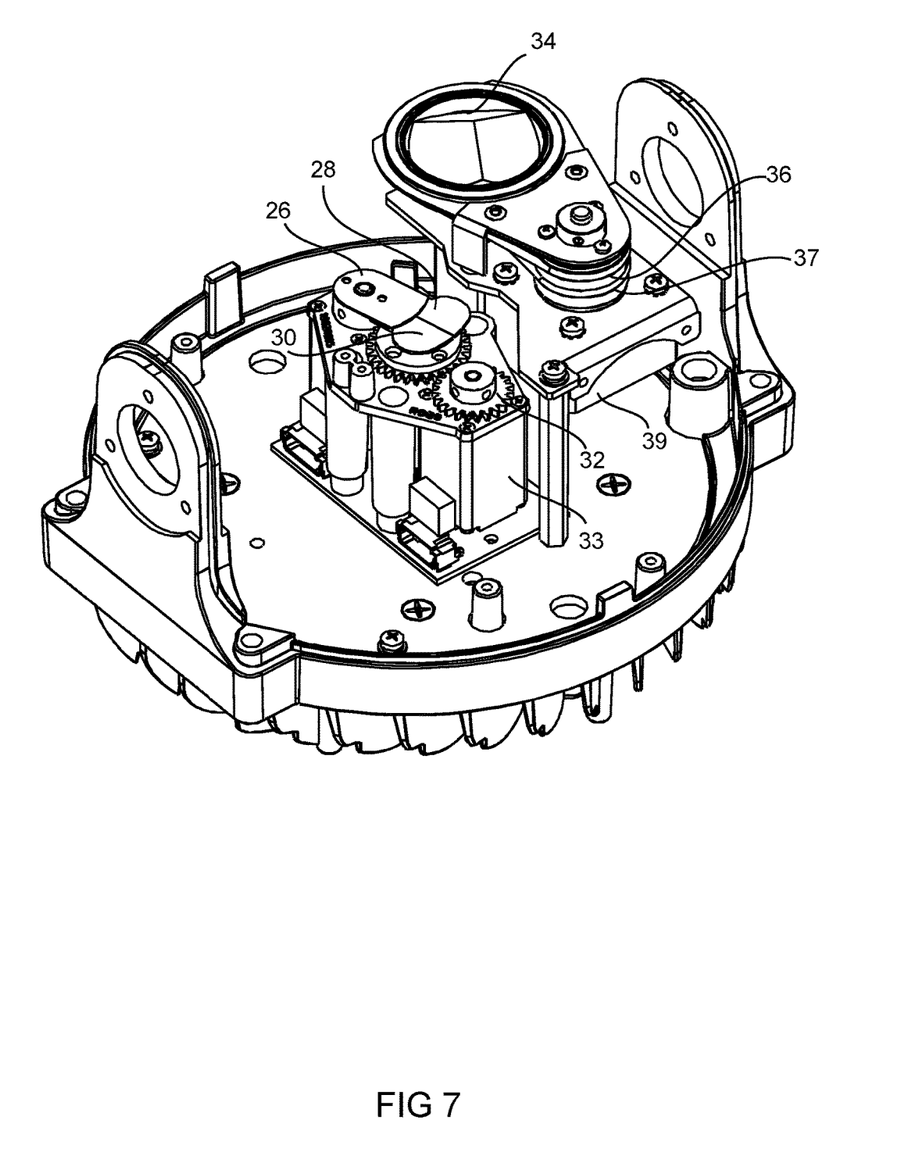
FIG. 7 illustrates the layout of a luminaire utilizing an embodiment of the optical softening elements in an engaged position.

FIG. 7 illustrates the layout of a luminaire utilizing an embodiment of the optical softening elements in an engaged position. This figure shows the same system as FIG. 6. In the position illustrated in FIG. 7 prism 34 is out of the light beam however diffuser arm 26 has been rotated such that second diffuser 30 is positioned across the exit port 23 of the light guide optic 22. In this position the light beam is diffused by second diffuser 30 and presents a homogenized beam without the flower effect.

Figure 8:
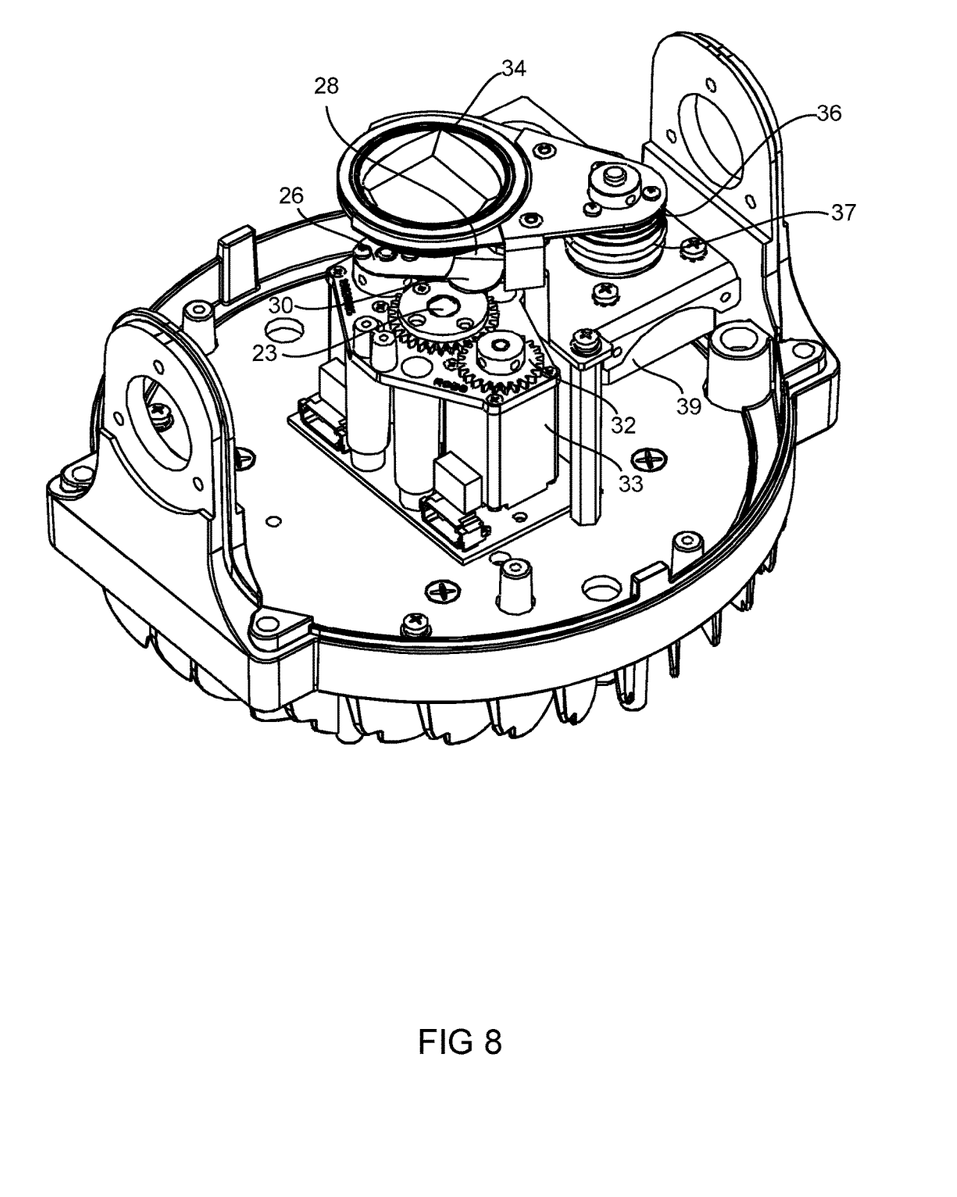
FIG. 8 illustrates the layout of a luminaire utilizing an embodiment of the multiplying optical elements in an engaged position.

FIG. 8 illustrates the layout of a luminaire utilizing an embodiment of the multiplying optical elements in an engaged position. This figure shows the same system as FIG. 6 and FIG. 7. In the position illustrated in FIG. 8, prism 34 has been positioned across the light beam; however, diffuser arm 26 has been rotated such that both first diffuser 28 and second diffuser 30 are out of the light beam. In this position the undiffused light beam presents the flower effect multiplied or affected by prism 34. Although just three combinations of positions of diffuser arm 26, and prism 34 have been shown, in practice any combination of the optical elements is envisaged.

Figure 9:
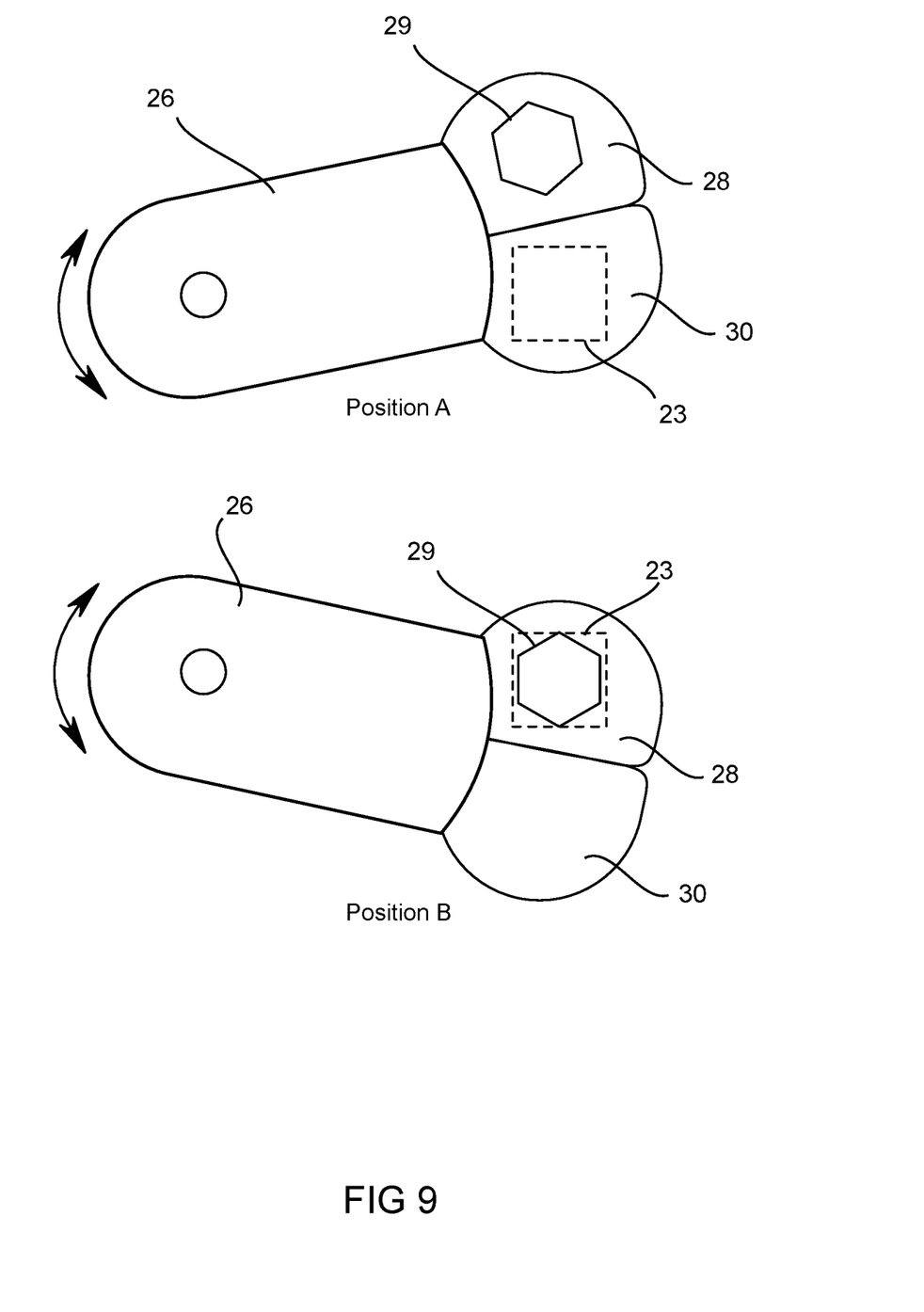
FIG. 9 illustrates detail of an embodiment of the optical softening diffuser arm.

FIG. 9 illustrates detail of an embodiment of the optical softening diffuser arm 26. Diffuser arm 26 is shown in two positions in FIG. 9. In position A, diffuser arm 26 is positioned such that second diffuser 30 is across exit port 23 (shown dashed as it is under the diffuser). Also illustrated is an optional feature of diffuser arm 26. First diffuser 28 includes mask 29 which serves to constrain the light to a masked shape. Mask 29 is an opaque mask with a central open aperture with, in this case, a hexagonal shape. Mask 29 helps to constrain the projected beam into a more rounded, non square shape. Mask 29 may be of any shape, not just the hexagon illustrated herein, including but not limited to circular, hexagonal, or octagonal.

In position B, diffuser arm 26 is positioned such that first diffuser 28 including mask 29 is across exit port 23 (shown dashed as it is under the diffuser). Diffusers 28 and 30 may offer differing amounts or types of diffusion producing different beam spreads in the output. Diffusers 28 and 30 may be patterned or molded glass, or plastic, or may be holographic diffusers, or other diffuser types as well known in the art. Although two different diffusers 28 and 30 are shown here the disclosure is not so limited and any number of diffusers or homogenizers may be affixed and selected as part of diffuser arm 26.

Figure 10:
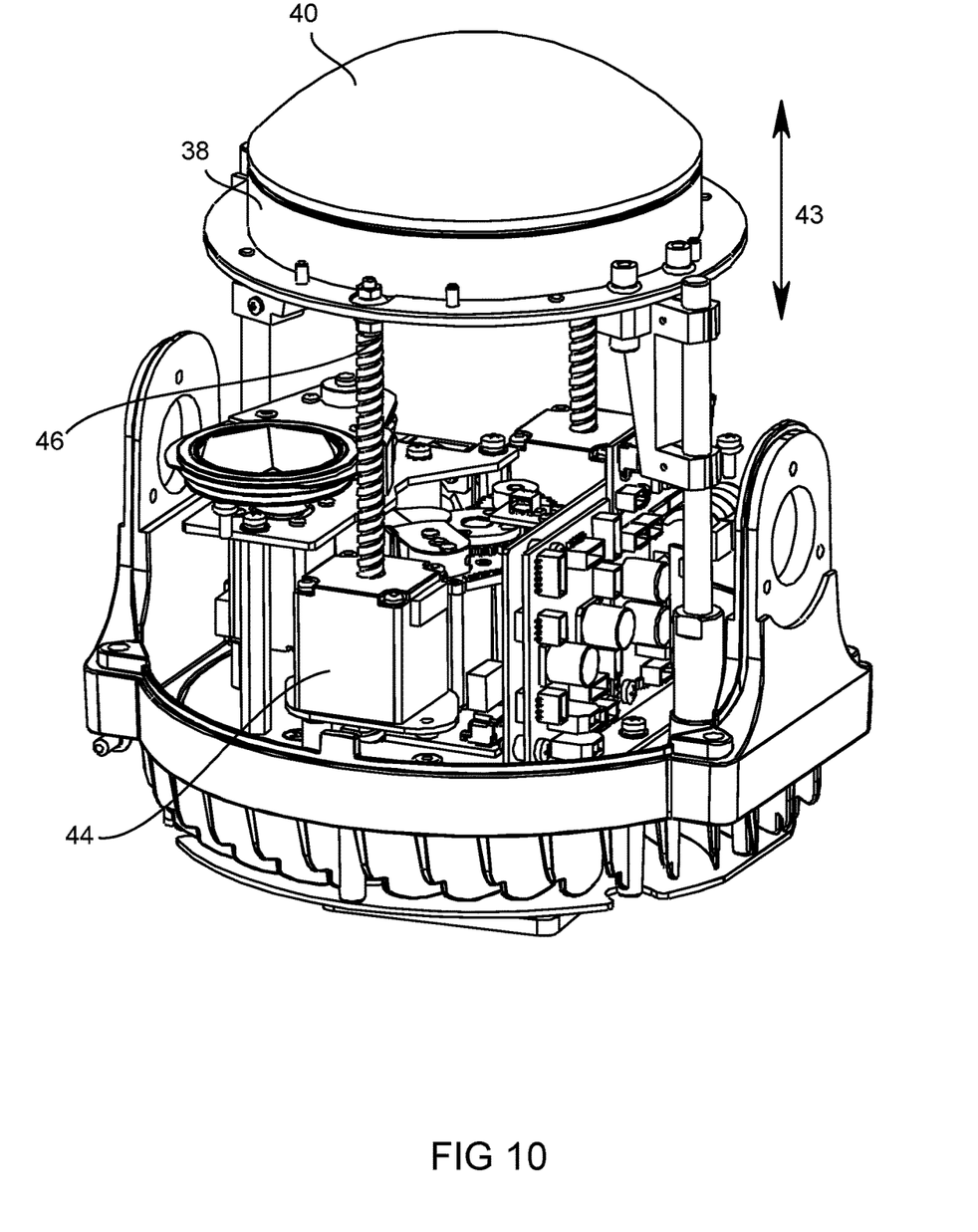
FIG. 10 illustrates the articulation drive system for the lenses of the embodiments illustrated.

FIG. 10 illustrates the articulation drive system for the lenses of the embodiments illustrated. First lens 38 and second lens 40 may be supported by lead screws 46 connected to motors 44. Rotation of motors 44 will move first lens 38 and second lens 40 back and forth along the optical axis of the system as indicated by arrow 43. Although a lead screw system is illustrated here, the disclosure is not so limited and other methods of moving the lenses such as belt systems, linear actuators, rack and pinion gears, and other methods well known in the art are envisaged. When the zoom lens module is down at the closest position to the optical rod and prism, the fixture is outputting maximum beam angle which is soft and diffused (wash light), and when the zoom lens module is up at the furthest position from the optical rod and prism, the fixture is outputting a minimum beam angle, which is sharp and focused and projecting the shape of RGBW chip when a diffusor is inserted or an array of RGBW chips (flower effect) if the diffusors are not engaging the light beam. The beam angle can also be varied between these extremes and further modified by engagement and disengagement of the prism.

Figure 11:
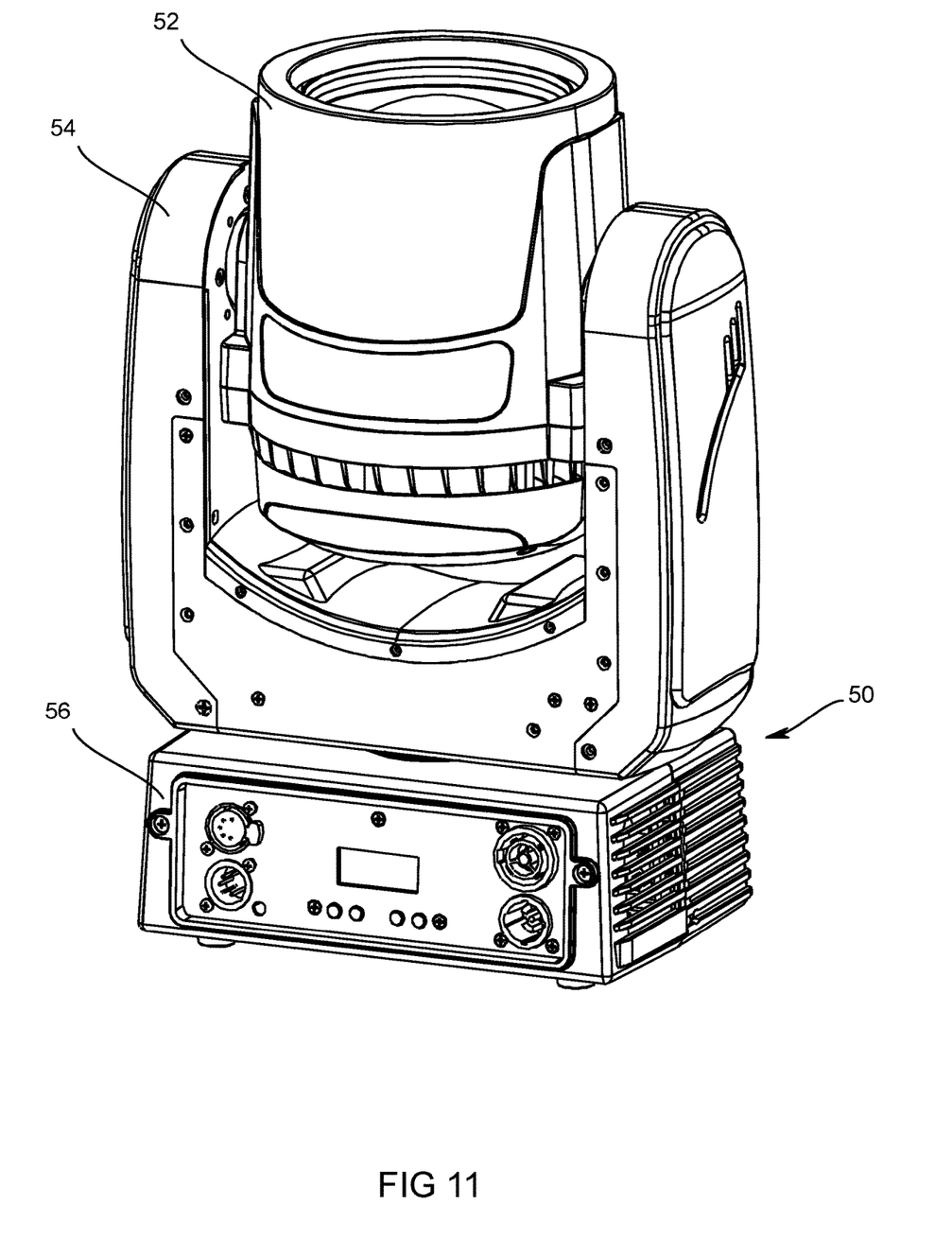
FIG. 11 illustrates a complete luminaire used in a lighting system illustrated in FIG. 1.

FIG. 11 illustrates a complete luminaire 50 used in a lighting system illustrated in FIG. 1. In the system illustrated, luminaire head 52 includes an optical system as previously described and is rotatably mounted within yoke 54 which, in turn, is rotatably mounted to top box 56. Either or both of the rotatable attachments from luminaire head 52 to yoke 54 or yoke 54 to top box 56 may be capable of continuous rotation where electrical connectivity is provided across the rotating joint through slip rings or other devices.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An automated luminaire, comprising:
   a light engine with a central light beam axis and with an LED array light source generating a plurality of colored light beams;
   a light guide which incompletely homogenizes such that the colored light beams visibly retain separation and individual color;
   a zoom lens system configured to receive light beams from the light guide and project the received light beams in a spreading pattern of beams that respectively opens and closes as lenses of the zoom lens system are moved toward and away from the light guide.

2. The automated luminaire of claim 1 where the light guide is articulated to rotate about the central light beam axis.

3. The automated luminaire of claim 1 where the zoom lens system is articulated to move along the central light beam axis, expanding and contracting the light beams as the zoom lens system is articulated.

4. The automated luminaire of claim 3 which further comprises an image multiplying optical modulator.

5. The automated luminaire of claim 4 wherein the image multiplying optical modulator is a multifaceted prism.

6. The automated luminaire of claim 4 where the image multiplying optical modulator is articulated to engage or disengage the light beams.

7. The automated luminaire of claim 4 where the image multiplying optical modulator is articulated to rotate about the central axis of the light beams.

8. The automated luminaire of claim 1 where the light guide has a cross sectional shape with an even number of opposing sides.

9. The automated luminaire of claim 8 where the light guide has a four-sided cross sectional shape.

10. The automated luminaire of claim 7 where the light guide has an entry port with a smaller area than an exit port.

11. The automated luminaire of claim 10 where the light guide exit port is polished.

12. The automated luminaire of claim 3 further comprising an articulated diffuser which can be articulated to engage or disengage the light beams.

13. The automated luminaire of claim 10 where the diffuser comprises a plurality of diffusers to select to change the level of diffusion.

14. The automated luminaire of claim 12 where the diffuser includes a masking pattern configured to change a cross-sectional profile of the light beams.

15. The automated luminaire of claim 14 where the masking pattern results in a light beam with a rounder cross-section.

16. An automated luminaire, comprising:
    a light engine with a central light beam axis and with an LED array light source generating a plurality of colored light beams;
    a light guide which
       incompletely homogenizes such that the colored light beams visibly retain separation and individual color,
       is articulated to rotate about the light beam axis,
       has a four-sided cross sectional shape,
       has an entry port with a smaller area than an exit port, and
       the exit port has a polished surface;
    a zoom lens system which
       receives light from the light guide and projects it, and
       is articulated to move along the light beam axis, expanding and contracting a pattern of light beams as lenses of the zoom lens system are moved relative to the light guide;
    a multi-faceted prism image multiplying optical modulator which is
       articulated to engage or disengage the light beams, and
       articulated to rotate about the central light beam axis; and
    an articulated diffuser which is articulated to engage or disengage the light beams, where the diffuser includes a masking pattern configured to change the cross sectional profile of the light beam to be rounder.

* * * * *

UNITED STATES PATENT AND TRADEMARK OFFICE
CERTIFICATE OF CORRECTION

PATENT NO. : 10,162,105 B2
APPLICATION NO. : 15/075191
DATED : December 25, 2018
INVENTOR(S) : Pavel Jurik et al.

Page 1 of 1

It is certified that error appears in the above-identified patent and that said Letters Patent is hereby corrected as shown below:

In the Specification

Column 1, Line 41 replace "connected is series" with --connected in series--.

Column 3, Line 18 replace "guide optic 22" with --light guide optic 22--; Line 29 replace "guide optic 22" with --light guide optic 22--.

In the Claims

Column 7, Claim 1, Line 27 replace "color;" with --color; and--.

Column 8, Claim 13, Line 13 the claim reference "10" should appear as --12--.

Signed and Sealed this
Sixteenth Day of April, 2019

Andrei Iancu
*Director of the United States Patent and Trademark Office*